March 6, 1934. L. D. SOUBIER 1,949,887
METHOD FOR MAKING BLOWN GLASS ARTICLES
Original Filed Sept. 20, 1924    2 Sheets-Sheet 1
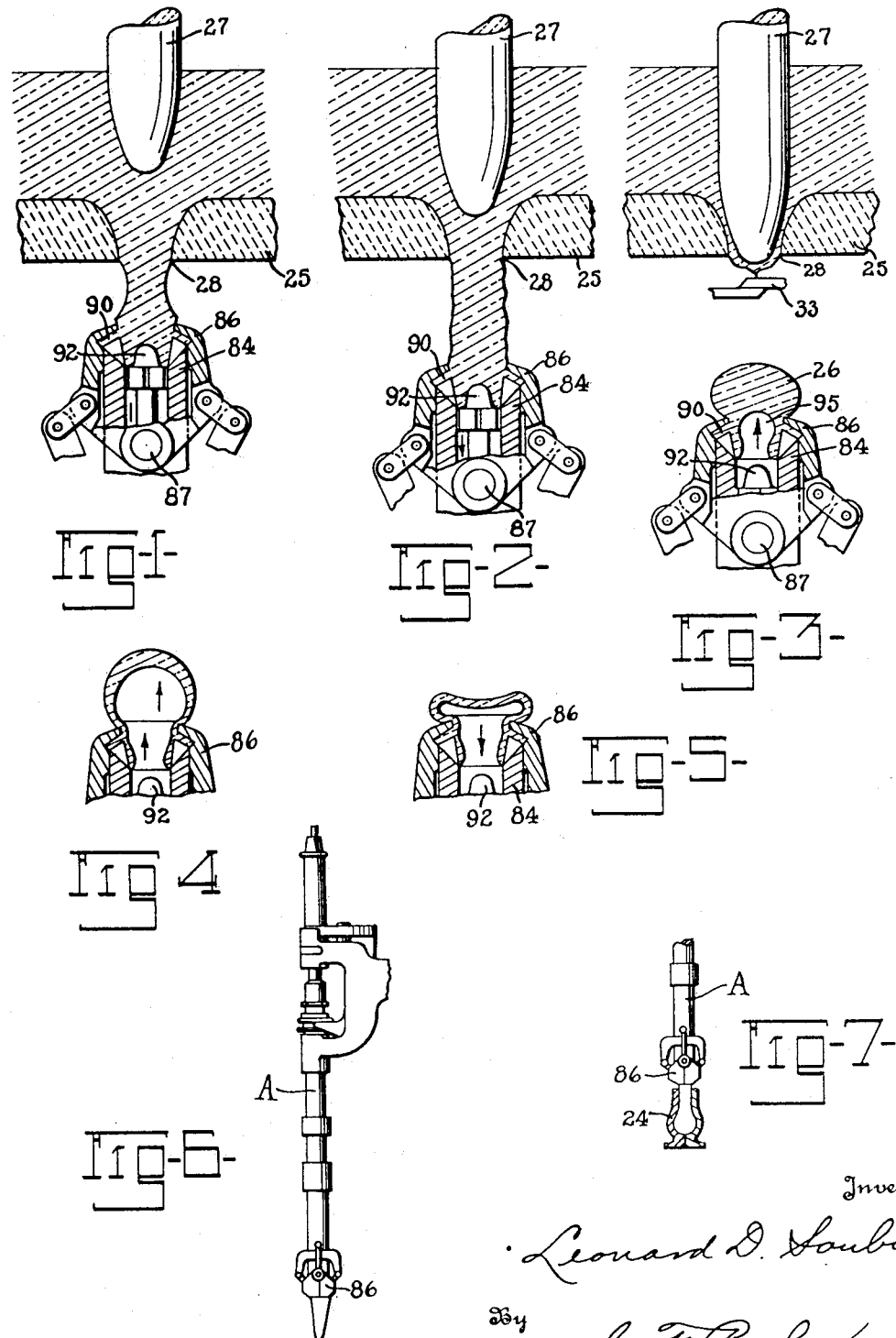

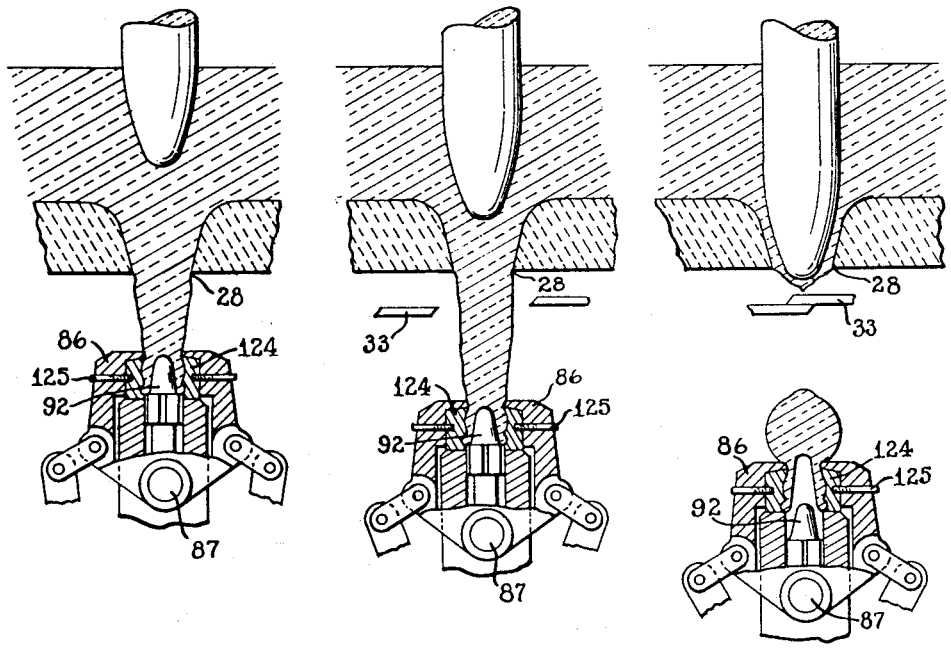

Patented Mar. 6, 1934

1,949,887

UNITED STATES PATENT OFFICE 1,949,887

METHOD FOR MAKING BLOWN GLASS ARTICLES

Leonard D. Soubier, Woonsocket, R. I., assignor to Owens-Illinois Glass Company, a corporation of Ohio Original application September 20, 1924, Serial No. 738,761. Divided and this application October 30, 1931, Serial No. 572,096

18 Claims. (Cl. 49—83)

My invention relates to a method for making electric lamp bulbs, bottles and other hollow glass articles. One form of the invention relates particularly to machines for making blown glassware in which thin walls are a requisite or where a paste mold finish is desired.

In the manufacture of hollow glass articles which are formed in molds, there are in extensive use at present two general methods of separating the individual masses or charges of glass from the supply body and introducing them into the molds. One of these is the suction method, typified in the Owens machine, in which the mold is brought into contact with the supply body and the charge of glass drawn into the mold by suction and then severed from the supply body. In the other method, the molten glass is caused to issue by gravity from an outlet, the issuing glass being periodically severed to form the individual charges or masses which are introduced after such severance, into the molds.

In the manufacture by either of these methods, of bottles or other hollow articles, the charge of glass is formed into a parison in a combined neck mold and body blank mold, after which the body blank mold is opened or removed, leaving the parison supported in the neck mold. A finishing mold then encloses the parison and the latter is blown to its final form.

An object of the present invention is to provide a novel method of forming the glass article in which the usual body blank mold is dispensed with, the charge of glass being supported in the neck mold in which the neck portion of the article is formed while the body portion is given a preliminary formation in the open, after which it is introduced into the finishing mold and given its final shape.

A feature of the invention comprises the formation of articles by a method in which the glass is permitted to issue from an outlet orifice in the form of a descending stream or column, the lower end of which, when it reaches a predetermined position, is engaged by a suitable supporting implement which then moves downward with the issuing glass until a sufficient quantity has been extruded, the glass being then severed below the outlet. The severed mass or charge of glass, while thus attached to its support, is given a preliminary hollow formation by a series of blowing operations, after which it is introduced into a finishing mold and blown to its final shape. In one form of apparatus used for practicing the invention, the support comprises a neck ring for forming the neck of the article.

Other objects of the invention will appear hereinafter.

The present application is a division of my co-pending application Serial Number 315,472, filed October 27, 1928, Means for making blown glass articles, on which Patent 1,859,114 was granted May 17, 1932, which application Serial Number 315,472 is a division of my application Serial Number 738,761, on which Patent 1,778,735 was granted October 21, 1930.

The invention herein disclosed may be practiced in connection with a glass blowing machine comprising spindles A (Fig. 6). Such machine may be considered a modification of the bulb making machines disclosed in the U. S. patents to Kadow, No. 1,248,664, December 4, 1917, and No. 1,527,556, February 24, 1925.

In the accompanying drawings:

Figs. 1 to 5 are sectional views showing the upper portion of the spindle and illustrating successive steps in the method of segregating a charge of glass from the supply body and giving it a preliminary formation before introducing it into the finishing mold. Fig. 1 shows the issuing glass gripped by the jaws on the spindle. Fig. 2 shows the spindle moved downward to an intermediate position before the charge is severed. Fig. 3 shows the charge or blank severed, the spindle moved farther down, the plunger withdrawn, and the blank partially expanded by the initial blowing operation. Fig. 4 shows a further expansion of the blank. Fig. 5 shows the blank collapsed by applying suction therein.

Fig. 6 is a view of the spindle in its inverted position.

Fig. 7 is a detail showing a blank in the finishing mold.

Figs. 8 to 12 illustrate a different form of the invention in which a neck forming thimble or neck mold is mounted on the spindle, thus adapting the invention for use in the formation of a bottle or other hollow article in which the neck end portion is finished in the mold. These figures illustrate successive steps in the preliminary formation of the parison, and correspond respectively to Figs. 1 to 5, inclusive.

The spindle A is periodically brought to a charge receiving position beneath a feeder from which the glass is supplied to the spindle. The feeder may be of any approved construction and as herein shown includes a regulating plunger 27 which is periodically reciprocated vertically over an outlet opening 28 of a container 25. The glass is periodically severed by a pair of shears 33 (Fig. 3).

The construction and operation of the spindle A are in the main like those fully set forth in the Kadow Patent Number 1,248,664 hereinbefore mentioned. In the present invention, however, the upper or glass receiving end of the spindle is specially designed for holding and shaping the glass, and a novel means and method are employed for attaching a charge of glass to the spindle and giving it an initial formation.

The spindle is provided at its upper end with a holder 84 which is mounted for a limited vertical movement relative to the spindle. A pair of jaws 86 are pivoted at 87 to said holder and are operated as by means of a sleeve slidable lengthwise of the spindle. When the spindle is brought to a charge receiving position directly beneath the feeder outlet 28, the stream or column of glass issuing from the feeder outlet moves downward into engagement with the holder 84. The jaws 86 which are preferably open when the glass engages the holder are then swung inward (Fig. 1) to grip the glass. The air is then exhausted through the spindle so that the glass enters the annular space provided by the end of the holder and the jaws 86, thus forming an annular flanged portion 90 on the blank of glass. The glass is thereby firmly attached to the spindle. A plunger tip 92 which at this time is in its raised position forms an initial blow opening in the glass.

As soon as the glass has been attached to the spindle, the latter is moved downward, the issuing glass being drawn out as shown in Fig. 2. The plunger 27 is also moving downward at the same time and thereby assists in expelling the glass. The relative time and rate at which the plunger 27 and spindle are moved downward are so coordinated that the issuing glass will form a column of approximately uniform diameter throughout its length. The shears 33 operate during the downward movement of the spindle to sever the glass, as indicated in Fig. 3, leaving a segregated charge or mass of glass 26 attached to the spindle. During the downward movement of the spindle, the plunger tip is withdrawn and air pressure supplied to expand the glass. The insipient expansion of the glass is indicated at 95 (Fig. 3). The blowing is continued until the parison assumes the hollow form shown in Fig. 4, after which the air is exhausted to collapse the glass (Fig. 5). After the glass is thus collapsed, the spindle is swung downward toward a horizontal position and the parison again expanded. The spindle is finally swung downward to the vertical depending position (Fig. 6) and the finishing mold 24 (Fig. 7) closed around the parison which is given its final shape in the mold. The various operations by which the formation of the lamp bulb or other article is completed after the charge of glass has been attached to the spindle and severed from the supply body as shown in Fig. 3, may be the same as those set forth in the Kadow patents hereinbefore mentioned.

Figs. 8 to 12, inclusive, illustrate a form of the invention adapted for making bottles or other articles in which the neck portion is finished in the mold. For this purpose, the spindle A is provided at its upper end with a neck forming thimble 124 arranged to form a bottle neck on the end of the charge of glass. This thimble or neck ring may be substantially the same as in an ordinary bottle forming machine and comprises two serapable halves, these halves being attached to the jaws 86 by screws 125. When the spindle is brought into position beneath the feeder outlet 28, the jaws 86 and neck ring 124 are preferably in their closed position and the plunger tip 92 raised as shown in Fig. 8. As the lower end of the descending column of glass engages the spindle, suction is applied, causing the glass to fill the neck ring and shape the neck of the article which is being formed. The spindle is then lowered, the plunger withdrawn, the shears 33 operated to sever the glass and the blowing operations performed, all substantially as above described in connection with Figs. 1 to 6, inclusive. While the spindle A is in its swung-down position with the parison supported in the neck mold and depending therefrom, the finishing mold 24 is closed around the parison and the latter blown to its finished form, after which the finishing mold and neck mold are opened to discharge the finished article.

Modifications may be resorted to within the spirit and scope of my invention.

What I claim is:

1. The method which consists in causing molten glass to move downward from a source of supply, grasping the free lower end of the downwardly moving glass by a support, moving the support downward while the glass is in the grasp of said support, then severing the glass at a point between said support and the supply while the glass is in the grasp of said support, and shaping the severed glass.

2. The method which consists in causing molten glass to move downward from a source of supply, grasping the free lower end of the downwardly moving glass by a support, moving the support downward while the glass is grasped thereby, then severing the glass at a point between said support and the supply while the glass is in the grasp of said support, and blowing the severed glass to hollow form while in the grasp of said support.

3. The method which consists in causing molten glass to move downward from a source of supply, grasping the free lower end of the downwardly moving glass by a support, moving the support downward while the glass is still connected with its source of supply, severing the glass between the source of supply and said support, and expanding the glass to hollow form while the glass is in the grasp of said support.

4. The method which consists in causing molten glass to move downward from a source of supply, engaging the free lower end of the downwardly moving glass by a support, moving the support downward while the glass is still connected with its source of supply, forming an initial blow opening in the glass while connected with said source of supply, severing the glass between the source of supply and said support during said downward movement of the support, and blowing the glass to hollow form while engage by said support.

5. The method which consists in causing molten glass to issue downward from an outlet in a container containing a supply body of glass, gripping the free end of the issuing body of glass and giving definite shape thereto, moving the gripping means downward away from the outlet while the glass is still connected with the supply body, and severing the glass at a point between the outlet and said gripping means.

6. The method which consists in causing molten glass to issue downward from an outlet in a container containing a supply body of glass, gripping the free end of the issuing body of glass and giving definite shape thereto, moving the gripping means downward away from the outlet while the glass is still connected with the supply body, severing the glass at a point between the outlet and said gripping means, thereby leaving a mass of bare glass projecting from the gripping means, and blowing said mass to hollow form.

7. The method which comprises causing molten glass to move downward through an outlet in a container, periodically severing the glass at a point beneath the outlet, engaging the free end of the issuing glass by a support and giving definite shape to said end, moving the support downward with the issuing glass before it is severed, causing said support to hold the severed portion of glass during and after severance and applying an expelling force to the glass within the container during said downward movement of the support and thereby augmenting the extrusion of glass during said movement.

8. The method of forming a hollow glass article which comprises: protruding a mass of bare glass from an outlet, receiving the free end of the protruding glass in a neck mold, and shaping it therein to form the neck of the article while the glass between the neck mold and outlet is free from lateral support, and severing the glass at a point between the outlet and neck mold after the formation of said neck has been completed.

9. The method of forming a hollow glass article which comprises: protruding a mass of bare glass from an outlet, receiving the free end of the protruding glass in a neck mold, shaping it therein to form the neck of the article while the glass between the neck mold and outlet is free from lateral support, severing the glass at a point between the outlet and neck mold after the formation of said neck has been completed, and expanding the severed glass in a finishing mold to give the article its final shape.

10. The method of making a hollow glass article which comprises causing molten glass to issue downwardly from an outlet in a bare suspended mass, and molding the lower end of said mass into hollow shape to form the neck portion of the article while the mass of glass between said end and the outlet remains bare and free from lateral support.

11. The method of making a hollow glass article which comprises causing molten glass to issue downwardly from an outlet in a bare suspended mass, molding the lower end of said mass into hollow shape to form the neck portion of the article while the mass of glass between said end and the outlet remains bare and free from lateral support, severing the mass from the supply body after said molding of the neck portion has been completed, and expanding said mass to hollow form by fluid pressure supplied through said neck.

12. The method of forming hollow glass articles which comprises causing a column of molten glass to issue from a downwardly opening outlet of a container for molten glass, enclosing and gripping the lower end of the column within a holder, moving said holder downwardly with the issuing glass after it has gripped said end, exerting an expelling force on the glass in the container as said holder moves downwardly to augment the rate at which the glass issues, severing the glass above the holder, and blowing the severed glass to hollow form while gripped in the holder.

13. The method of forming hollow glass articles which comprises causing a column of molten glass to issue from a downwardly opening outlet of a container for molten glass, connecting the lower end of the column with a holder, moving said holder downwardly with the issuing glass after said connection, severing the glass between the holder and said outlet, leaving a mass of bare glass protruding upward from the holder, and expanding said mass to hollow form by fluid pressure supplied through the lower end of said column of glass.

14. The method which comprises projecting and suspending an unconfined column of molten glass from a supply body, giving a permanent exterior shape to the free end of the suspended column while connected with and moving outward from the supply body, and severing the unconfined column from the supply body after said shaping of the end of the column.

15. The method which comprises projecting and suspending an unconfined column of molten glass from a supply body, giving a permanent exterior shape to the free end of the suspended column while connected with and moving outward from the supply body, severing the unconfined column from the supply body after said shaping of the end of the column, and expanding the severed glass to form a hollow article.

16. The method which comprises protruding a column of unconfined molten glass from a supply body, giving a hollow form to the free end of the protruding glass, causing the formed end of the glass to move away from the supply body while the protruding glass is still integrally connected with the supply body, severing the issued glass while the major portion thereof is still unconfined, and introducing air under pressure through said formed end and thereby expanding the glass.

17. The method of forming a hollow glass article which comprises projecting an elongated, unconfined mass of glass from a supply body, giving a hollow shape to the free end of the projecting glass, moving said shaped end away from the supply body while still integrally connected therewith and increasing the volume of said mass during said movement, and disconnecting the mass from the supply body.

18. The method of forming a hollow glass article which comprises projecting an elongated unconfined mass of glass from a supply body, giving a hollow shape to the free end of the projecting glass, moving said shaped end away from the supply body while still integrally connected therewith and increasing the volume of said mass during said movement, disconnecting the mass from the supply body, expanding the mass to hollow form by pneumatic pressure applied internally of the mass, and molding the exterior of the mass to the shape of the finished article during said expansion.

LEONARD D. SOUBIER.